(12) United States Patent
Wen et al.

(10) Patent No.: US 6,936,235 B2
(45) Date of Patent: Aug. 30, 2005

(54) PROCESS FOR PREPARATION OF ZIRCONIUM TUNGSTATE CERAMIC BODY, ZIRCONIUM TUNGSTATE CERAMIC BODY PREPARED THEREBY, AND TEMPERATURE COMPENSATED FIBER BRAGG GRATING DEVICE

(75) Inventors: Hui-Ling Wen, Taipei (TW); John Lin, Taipei (JP); Yu-Lung Lo, Young-Kang (TW)

(73) Assignee: Broptics Technology Inc., Taipei (TW)

( * ) Notice: Subject to any disclaimer, the term of this patent is extended or adjusted under 35 U.S.C. 154(b) by 351 days.

(21) Appl. No.: 10/041,325

(22) Filed: Jan. 7, 2002

(65) Prior Publication Data

US 2003/0054941 A1 Mar. 20, 2003

(30) Foreign Application Priority Data

Aug. 16, 2001 (TW) .......................................... 90120128 A

(51) Int. Cl.$^7$ ................................................. C01G 49/00
(52) U.S. Cl. .................... 423/594.13; 423/606; 423/608
(58) Field of Search ........................... 423/594.13, 606, 423/608

(56) References Cited

U.S. PATENT DOCUMENTS

| 5,042,898 A | 8/1991 | Morey et al. .................. 385/37 |
| 5,514,360 A | 5/1996 | Sleight et al. |
| 5,694,503 A | 12/1997 | Fleming et al. |
| 5,703,978 A | 12/1997 | DiGiovanni et al. .......... 385/37 |
| 6,183,716 B1 | 2/2001 | Sleight et al. |
| 6,187,700 B1 * | 2/2001 | Merkel ......................... 501/32 |
| 6,258,743 B1 | 7/2001 | Fleming et al. |
| 6,377,729 B2 * | 4/2002 | Merkel ......................... 385/37 |

OTHER PUBLICATIONS

Yoffe, G.W., et al. "Passive temperature–compensating package for optical fiber gratings" *Applied Optics*, vol. 34, No. 30, p. 6859–6861, (1995).
Chang, L.L.Y, et al. "Condensed Phase Relations in the Systems $ZrO_2$ –$WO_2$ –$WO_3$ and $HfO_2$ –$WO_2$ –$WO_3$ " *J. Am.Ceram.Soc*, vol. 50, No. 4, p. 211–215, (1967).
Yamamura, Y., et al. "Heat capacity anomaly due to the α–to–β structural phase transition in $ZrW_2O_8$" *Solid State Communications*, vol. 114, p. 453–455, (2000).
Mary, T.A., et al. "Negative Thermal Expansion from 0.3 to 1050 Kelvin in $ZrW_2O_8$" *Science*, vol. 272, p. 90–92, (1996).
Sleight, A.W., et al "Isotropic Negative Thermal Expansion" *Annu. Rev. Mater. Sci.*, vol. 28, p. 29–43, (1998).
Closmann, C., et al. "Low–Temperature Synthesis of $ZrW_2O_8$ and Mo–Substituted $ZrW_2O_8$" *J. Solid State Chem.*, vol. 139, p. 424–426, (1998).
Lyckfeldt, O., et al., "Processing of Porous Ceramics by 'Starch Consolidation'" J. European Ceramic Soc., vol. 18, p. 131–140, (1998).

\* cited by examiner

*Primary Examiner*—Paul Marcantoni
(74) *Attorney, Agent, or Firm*—Ladas & Parry

(57) ABSTRACT

The present invention discloses a process for the preparation of zirconium tungstate ($ZrW_2O_8$) ceramic body, comprising a reactive sintering step to react and sinter powders of the raw materials comprising a Zr-containing compound and a W-containing compound to form a zirconium tungstate ceramic body. The addition of zirconium tungstate powders as the seeds in the process can effectively reduce the steps, shorten the preparation time, lower the sintering temperature and duration, save the cost, and provide the zirconium tungstate ceramic body with uniform microstructure. Also, a process for the preparation of modified zirconium tungstate ceramic body is disclosed, by forming a second phase in the zirconium tungstate ceramic body to tune the thermal expansion coefficient of the zirconium tungstate ceramic body. The present invention also relates to the use of the modified zirconium tungstate ceramic body to provide a temperature compensated fiber bragg grating (FBG) device.

26 Claims, 2 Drawing Sheets

PROCESS FOR PREPARATION OF ZIRCONIUM TUNGSTATE CERAMIC BODY, ZIRCONIUM TUNGSTATE CERAMIC BODY PREPARED THEREBY, AND TEMPERATURE COMPENSATED FIBER BRAGG GRATING DEVICE

FIELD OF THE INVENTION

The present invention relates to the preparation of zirconium tungstate ($ZrW_2O_8$) ceramic body, a modified zirconium tungstate ceramic body, and the use of the modified zirconium tungstate ceramic body to provide a temperature compensated optical fiber bragg grating (FBG) device.

BACKGROUND OF THE INVENTION

Optical fiber bragg grating (FBG) is commonly applied in various components for manufacturing dense wavelength division multiplexing (DWDM), such as FBG stabilizing laser source, and various DWDM devices used in multiplexer, de-multiplexer, and optical add-drop multiplexer (OADM). However, in actual applications, increment of environmental temperature may affect the performance of the FBG. Because the grating space and index of refraction of the FBG determine the central frequency of the reflected light, special care must be given to ensure the precision of the FBG. Since increment of environmental temperature will change the index of refraction of the FBG, thereby causing increment of the wavelength of the optical fiber thereby deviating from the designated central wavelength, measures shall be taken to prevent occurrences of such changes.

To resolve the above problem, U.S. Pat. No. 5,042,898 discloses a temperature compensated FBG device. The device comprises two metals with different thermal expansion coefficients. Relevant references further include, such as U.S. Pat. No. 5,703,978 and *Applied Optics.*, Vol. 34 (30), p.6859, 1995 (G. W. Yoffe et. al.). However, the prior art still has the drawbacks of uneasily attaining the desired precision, being complicated in structures, involving difficult preparation steps, and being higher in cost. Therefore, it would be highly desirable to have an easily fabricated and simple temperature compensated FBG device with excellent temperature compensated result. For example, the use of materials with negative coefficient of thermal expansion (negative expansion materials) is one of the approaches and has been disclosed in U.S. Pat. No. 5,694,503, which is incorporated herein for reference.

Most materials expand upon heating and shrink upon cooling, whereas few materials shrink upon heating. Zirconium tungstate is a known isotropic negative expansion material within a temperature range from 0.3 K to its decomposition temperature of about 1050 K. This material was first synthesized by J. Graham et al. (J. Am. Ceram. Soc., 42 [11] 570, 1959) in 1959 and its negative expansion property was discovered in 1968 (J. Am. Ceram. Soc., 51 [4] 227, 1968).

According to the phase diagram of $ZrO_2$ and $WO_3$ (J. Am. Ceram. Sco., 50 [4] 211, 1967), $ZrW_2O_8$ is formed from $ZrO_2$ and $WO_3$ at 1105° C., and melts at 1257° C.; apparently it is only thermodynamically stable within a temperature range of about 150° C. It must be quenched (rapidly cooled) from high temperature to avoid decomposition into $ZrO_2$ and $WO_3$. Once formed, nevertheless, $ZrW_2O_8$ has a high degree kinetic stability, in metastable condition, below 770° C. (1050 K). Thus, $ZrW_2O_8$ will decompose into $ZrO_2$ and $WO_3$ when heated to about 770° C., and react to reform $ZrW_2O_8$ if the temperature is increased to 1105° C.

Generally, the preparation of ceramic body includes forming ceramic powders by the solid-state reaction or chemical synthesis process, grinding the powders, and compaction the grinded powders and sintering. Specifically, the preparation of single phase ceramic powders is followed by the sintering densification of the powders. In relevant researches, the zirconium tungstate ceramic body is normally prepared by using the above solid-state reaction process or chemical synthesis process.

In the earlier time, the ceramic powders were prepared by solid-state reaction, and then sintered to provide zirconium tungstate ceramic bodies. For example, according to the process described in *Solid State Comm.*, 114, 453, 2000 (Yamamura et al.), weighted with appropriate ratio and mixed $ZrO_2$ and $WO_3$ powders were compacted and then calcined at 1473K for 12 hours in air to carry out the solid-state reaction to form zirconium tungstate, which was then rapidly cooled down to room temperature. After grinding the pellets, the resulting powders were compacted again and then sintered at 1473K for 12 hours for densification and quenched in liquid nitrogen to form a single-phase zirconium tungstate ceramic body. Nonetheless, the solid-state sintering process for the preparation of zirconium tungstate ceramic bodies normally requires ten or more hours to provide a pure phase zirconium tungstate ceramic bodies. Furthermore, if the particle sizes of the raw material powders are inappropriate or the admixing is unwell, it is difficult to obtain a uniform and single phase zirconium tungstate ceramic body by solid-state reaction process. The applicability of the zirconium tungstate ceramic body prepared thereby will thus be affected.

In addition to the solid-sate reaction process to prepare the zirconium tungstate ceramic powder, Sleight et al. proposed in 1996 the preparation of pure phase zirconium tungstate by a chemical synthesis process. Relevant publications, such as *Science*, 272, 90, 1996, *Annu. Rev. Mater. Sci.*, 28, 29, 1998, *J. Solid State Chem.*, 139, 424, 1998, and U.S. Pat. No. 5,514,360, are incorporated herewith for reference. The chemical synthesis process for the preparation of zirconium tungstate powder comprises the following steps. A solution containing $Zr^{4+}$ and $W^{6+}$ ions is heated to evaporate the liquid phase and thereby produce precipitate. The precipitate is heated to provide a mixture comprising $ZrO_2$ and $WO_3$ or $ZrW_2O_8$. The mixture is then grinded and re-heated to obtain a single-phase zirconium tungstate. It has been proved that the chemical synthesis process provides an efficient method to control the particle sizes of powders and the admixing. However, the process needs a solvent to adjust the pH value of the solution to obtain the precipitate of $Zr^{4+}$ and $W^{6+}$ and also requires another step of heating the precipitate. The preparation time is long and the preparation steps are complicated.

Surprisingly, the inventors of the present invention has found that when preparing zirconium tungstate by the reactive sintering process, the addition of powders of zirconium tungstate single crystal in the powders of raw materials comprising the Zr-containing compound and W-containing compound as the seeds for the formation of the grain of zirconium tungstate can reduce the formation energy and effectively simplify the procedure, shorten preparation time and save cost while obtaining zirconium tungstate ceramic bodies with uniform microstructure. In addition, by the formation of a second phase different from zirconium tungstate inside the ceramic body, the present invention efficiently provides the ceramic body with a desired expansion coefficient to provide the desired temperature compensation effect on FBG.

SUMMARY OF THE INVENTION

The present invention relates to a process for the preparation of zirconium tungstate ceramic body, comprising
(a) dispersing the raw materials powders comprising a Zr-containing compound and a W-containing compound and powders of zirconium tungstate single crystal in deionized water and through grinding and well admixing to form a slurry;
(b) adding a binder to the slurry of (a) to form a mixture;
(c) drying the mixture of (b) to obtain granules and then dry-pressing them to form a compact; and
(d) sintering the compact to obtain the zirconium tungstate ceramic body.

According to the process of the present invention, the chemical reaction of the raw materials powders and the sintering densification of the compact are carried out in one heating treatment step, i.e., accomplishing the production of zirconium tungstate and the sintering densification of the compact in the same heating treatment step, to provide the desired zirconium tungstate ceramic body. The process of the present invention can effectively simplify the procedure, shorten preparation time, save the cost, and provide the zirconium tungstate ceramic body with uniform microstructure.

The process of the present invention can further tune the thermal expansion coefficient of a zirconium tungstate ceramic body. By controlling the ratio of Zr to W in the raw materials powders comprising the Zr-containing compound and W-containing compound, a second phase of residual $ZrO_2$ or $WO_3$ is formed inside the zirconium tungstate ceramic body to tune the thermal expansion coefficient as desired. Alternatively, by incorporating an additive into the powders of raw materials, a second phase or pores uniformly distributed inside the zirconium tungstate ceramic body can be formed to make the thermal expansion coefficient changed.

The present invention further relates to a temperature compensated FBG device, which comprises a substrate made of the zirconium tungstate ceramic body of the present invention. The device can further have an adhesive layer with positive thermal expansion coefficient on the substrate, or be further fitted with a low thermal expansion coefficient material between the optical fiber and the substrate of zirconium tungstate, or be further fitted with a tuning means to attain the purpose of controlling the center wavelength of FBG.

DESCRIPTION OF THE SYMBOLS OF THE DRAWINGS

Figure 1:
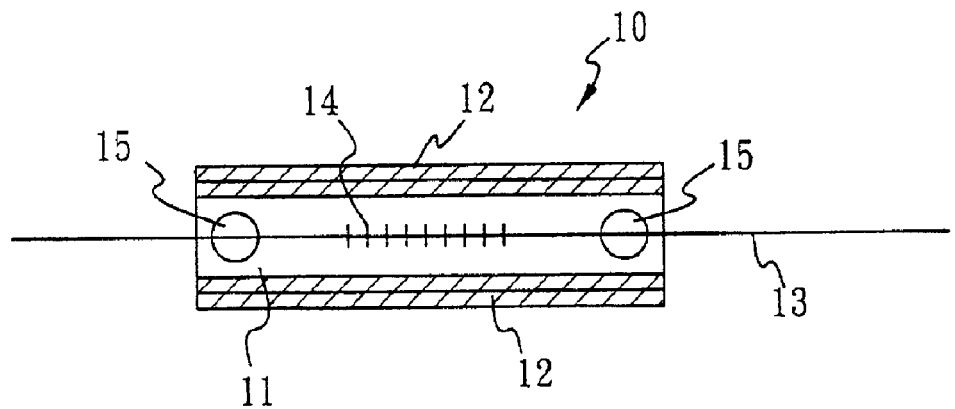
FIG. 1 is a top view of a temperature compensated FBG device comprising a zirconium tungstate ceramic substrate according to the present invention, wherein the device further comprises an adhesive layer with positive thermal expansion coefficient.

10, 20, or 30 represents a temperature compensated FBG device;
11 represents a zirconium tungstate ceramic substrate;
12 represents an adhesive layer;
13 represents an optical fiber;
14 represents a fiber bragg grating;
15 represents an affixing point of epoxide adhesive;
21 represents a zirconium tungstate ceramic substrate;
23 represents an optical fiber;
24 represents a fiber bragg grating;
25 represents an affixing point of epoxide adhesive;
26 represents a low thermal expansion coefficient material;
301 or 302 represents an arm;
31 represents a zirconium tungstate ceramic substrate;
33 represents an optical fiber;
34 represents a fiber bragg grating;
35 represents an affixing point of epoxide adhesive;
37 represents a counter threaded rod;
371 represents a positive screw thread;
372 represents a counter screw thread; and
38 represents an indenting.

DETAIL DESCRIPTION OF THE INVENTION

The present invention provides a process for the preparation of zirconium tungstate ceramic body, comprising
(a) dispersing the raw materials powders comprising a Zr-containing compound and a W-containing compound and powders of zirconium tungstate single crystal in deionized water and through grinding and well admixing to form a slurry;
(b) adding a binder to the slurry of (a) to form a mixture;
(c) drying the mixture of (b) to obtain granules and then dry-pressing them to form a compact; and
(d) sintering the compact to obtain the zirconium tungstate ceramic body.

In the process of the present invention, the Zr-containing compound and W-containing compound can be any Zr-containing compounds and W-containing compounds suitable to the reactive sintering process. The compounds can be the oxides, sulfates, carbonates, nitrates, acetates, sulfides, or hydroxides, of Zr and W, tungsten metal, or tungstic acid ($H_2WO_4$) or mixture thereof, the oxides of Zr and W, i.e., $ZrO_2$ and $WO_3$, are preferred.

According to the process of the present invention, the temperature for reactive sintering the compacts is typically from about 1105° C. to about 1257° C., preferably, about 1150° C. to about 1200° C. and the reactive sintering duration is typically from about 1 to about 10 hours, preferably, about 3 to about 8 hours, and more preferably, about 4 to about 6 hours. Generally, as the sintering temperature is higher, the required sintering duration will be shorter.

To prepare a single phase zirconium tungstate ceramic body, the binder for the process of the present invention is selected from conventional organic binders, e.g., the binders disclosed in U.S. Pat. No. 5,694,503. In other words, the specie and amount of the binder are not critical to the process of the present invention. Persons skilled in the art can select the proper species and amount of the binder as required to practice the process of the present invention.

According to the process of the present invention, the powders of zirconium tungstate single crystal are added to the raw materials powders as the seeds for the formation of $ZrW_2O_8$ by the reaction of the Zr-containing compound and W-containing compound, to effectively lower the reaction temperature, shorten reaction time, and improve the uniformity of the ceramic bodies prepared thereby, and thus to overcome the drawback that the conventional sintering process cannot easily prepare uniform zirconium tungstate ceramic bodies. The amount of the seed powders of zirconium tungstate is not critical. However, when the added amount is overly large, the efficacy will not be improved accordingly. As to economic concerns, the amount is generally from about 0.1 to about 5 wt. %, based on the total weight of the raw materials powders, preferably, from about 0.5 to about 2 wt. %. Although the $ZrW_2O_8$ seeds inside the green body may decompose into $ZrO_2$ and $WO_3$ when heated to 770° C., the $ZrO_2$ and $WO_3$ in situ react to form $ZrW_2O_8$ when continuously heated at higher temperature. This reaction of in situ forming $ZrW_2O_8$ is earlier than the reaction of powders of raw materials, thus the in situ formed $ZrW_2O_8$ still can be the seeds of the reaction to improve the uniformity of the ceramic body.

As to demands for FBG package, it is necessary to tune the thermal expansion coefficient of the ceramic substrate. Generally, the purpose of tuning the thermal expansion coefficient can be achieved by fabricating a composite or porous ceramic body.

Regarding the method of tuning the thermal expansion coefficient of zirconium tungstate and copper composites, Holzer et al. (J. Mater. Res., 14, 3, 780, 1999) added zirconium tungstate of 50 to 60 vol. % in copper to form $Cu/ZrW_2O_8$ metal matrix composites, and observed their phase transition and the variation of thermal expansion coefficient. Moreover, U.S. Pat. No. 5,694,503 discloses the addition of other oxides in the powders of zirconium tungstate, such as $Al_2O_3$, MgO, and CaO etc. that are positive thermal expansion coefficient materials, to form a second phase inside the zirconium tungstate ceramic body to tune the thermal expansion coefficient.

In the process of the present invention adopted for the preparation of zirconium tungstate ceramic body, sintering is performed while chemical reaction takes place simultaneously. According to the disclosure of U.S. Pat. No. 5,694, 503, if the process of the present invention adds oxides different from the Zr-containing and W-containing compounds, the added oxides may react with one of the raw material reactants before the formation of zirconium tungstate, thereby influencing the formation of the final product, zirconium tungstate ceramic body. The details can be referred to in U.S. Pat. No. 6,187,700.

Therefore, the present invention further provides a modified zirconium tungstate ceramic body with an tuned thermal expansion coefficient, by controlling the ratio of the raw material reactants in the entire reaction system, or by controlling the species and amount of the incorporated additives to form a second phase or pores uniformly distributed in the sintered zirconium tungstate ceramic body.

In the process of the present invention, the approach of controlling the ratio of Zr to W in the raw materials comprising the Zr-containing compound and W-containing compound lies in forming the second phase of residual $ZrO_2$ or $WO_3$ inside the sintered zirconium tungstate ceramic body, to prevent the added oxides different from the Zr-containing and W-containing compounds from reacting with the raw material reactants and the followed influence on the formation of zirconium tungstate. Also, the approach can prevent the formation of microcracks in the zirconium tungstate ceramic body because of the stress inside the materials upon the variation of temperature, raised from the nonuniform distribution or overly large particle size.

In the process of the present invention, the addition of inorganic binder in the raw materials powders can form a uniform distributed second phase grains inside the zirconium tungstate ceramic body after a high temperature treatment. Nevertheless, it should be noted that the formed oxides would not have influence on the reaction system of $ZrO_2$ and $WO_3$. For example, the inorganic binder can be $Na_2O.nSiO_2$ that forms a second phase of residual $Na_2O$, $ZrSiO_4$, and minor amount of $WO_3$ after a heat treatment to achieve the purpose of tuning the thermal expansion coefficient as desired.

The amounts of the residual $ZrO_2$ or $WO_3$ and/or inorganic binder can be determined by any of known calculation models, such as that disclosed in U.S. Pat. No. 5,694,503. The amounts are not the technical characteristics of the present invention.

In addition to forming composite ceramic bodies, the thermal expansion coefficient can be tuned by forming porous ceramic bodies. There are many processes for the preparation of porous ceramic bodies, generally by adding an organic binder that can generate pores inside the zirconium tungstate ceramic bodies after sintering. In the process of the present invention, the thermal expansion coefficient of zirconium tungstate ceramic can be tuned as desired by adding an organic binder to the raw materials powders to form a second phase of pores uniformly distributed inside the zirconium tungstate ceramic body after sintering. A direct-consolidation process as disclosed in J. European Ceramic Soc., 18, 131,1998 is preferred. The direct-consolidation process comprises admixing ceramic powders, an organic binder, and water under room temperature to form slurry, pouring the slurry into a mold and heating to the temperature above the gelation temperature of the binder to cure, then drying the cured product to obtain a ceramic green body. Then the ceramic green body is heated to remove the organic binder and sintered to obtain a porous ceramic body. In the present invention, the organic binder is preferably selected from the group consisting of starch and methylcellulose.

According to the present invention, the modified zirconium tungstate ceramic body with tuned thermal expansion coefficient can also be prepared by directly using powders of zirconium tungstate to replace the stoichiometric Zr-containing compound and W-containing compound, and by admixing the zirconium tungstate powders with the second phase forming-additive(s) followed by the sintering densification.

The modified zirconium tungstate ceramic body according to the present invention is composed of zirconium tungstate matrix as the first phase and residues as the second phase, wherein the second phase is composed of the component(s) selected from the group consisting of $ZrO_2$, $WO_3$, $Na_2O+ZrSiO_4$, pores, and combination thereof.

The present invention further relates to a temperature compensated FBG device comprising a substrate made of the modified zirconium tungstate ceramic body of the present invention. The device is now illustrated by the following embodiments.

FIG. 1 is a temperature compensated optical fiber bragg grating device 10, comprising a zirconium tungstate ceramic substrate 11 of the present invention, an adhesive layer 12 with positive thermal expansion coefficient coated on the substrate 11 (in this embodiment, the adhesive is coated on both side surfaces of the substrate), an optical fiber 13 affixed to the two ends of the substrate 11 by the affixed points of epoxide adhesive 15, wherein the optical fiber 13 is embedded with gratings at the mid-section thereof to form a fiber bragg grating 14. By the combination of the zirconium tungstate ceramic substrate 11 with the adhesive layer 12, the thermal expansion coefficient of the compensated device can be further tuned to the desired value.

Figure 2:
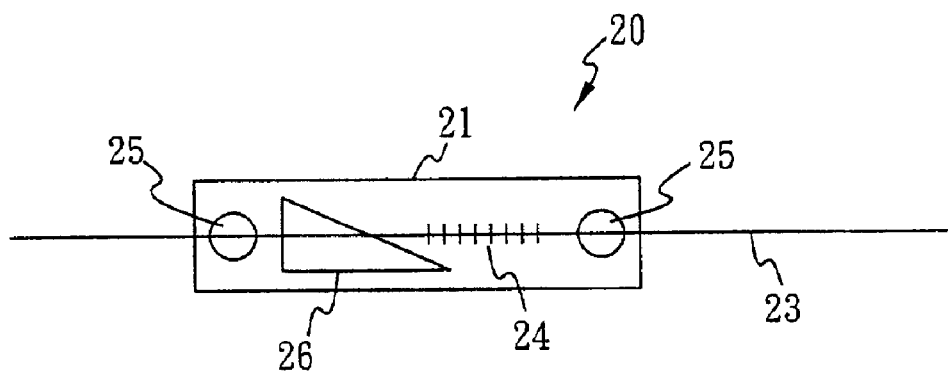
FIG. 2 is a top view of another temperature compensated FBG device comprising a zirconium tungstate ceramic substrate according to the present invention, wherein the device further comprises a low thermal expansion coefficient material.

FIG. 2 is another temperature compensated optical fiber bragg grating device 20, comprising a zirconium tungstate ceramic substrate 21 of the present invention and a low expansion coefficient material 26. In this embodiment, an optical fiber 23 is affixed to the two ends of the substrate 21 by the affixed points of epoxide adhesive 25. The optical fiber 23 is embedded with gratings at the mid-section thereof to form a fiber bragg grating 24. The low expansion coefficient material 26 is set between the substrate 21 and the optical fiber 23. The low expansion coefficient material 26 is directed to the one with a thermal expansion coefficient lower than that of stainless steel, preferably, lower than one tenth of stainless steam or less, and can be selected from quartz, invar, etc. Moreover, there is no specific limitation to the shape of the low expansion coefficient material, preferably being a triangle. By the combination of the zirconium tungstate ceramic substrate 21 with the low expansion coefficient material 26, the central wavelength of fiber bragg grating 24 can be further tuned according to the demand for specification.

Figure 3:
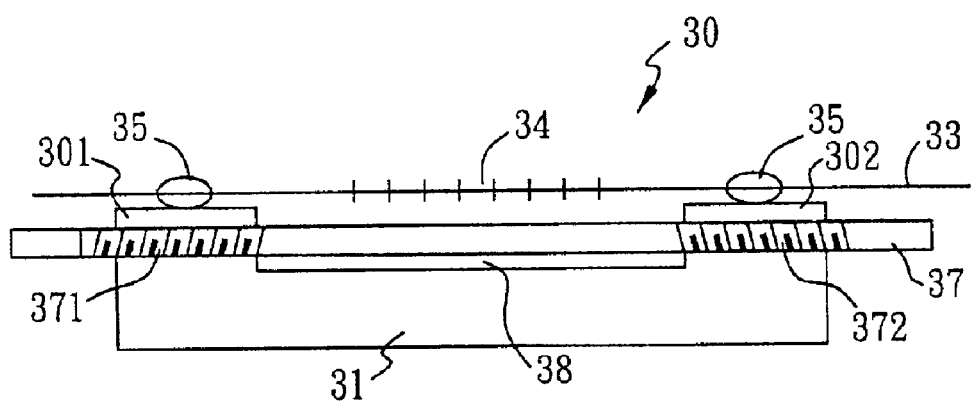
FIG. 3 is a cross-sectional view of another temperature compensated FBG device comprising a zirconium tungstate ceramic substrate according to the present invention, wherein the compensated device further comprises a tuning device.

FIG. 3 is another temperature compensated optical fiber bragg grating device 30, comprising a zirconium tungstate ceramic substrate 21 of the present invention and a threaded rod 37 of a manual adjusting device. The substrate 31 is formed with an indenting 38 and two arms 301 and 302 thereon. The threaded rod 37 having a positive screw thread 371 and a counter screw thread 372 is disposed across the indenting 38 along the longitudinal direction of the substrate 31, wherein the positive screw thread 371 and counter screw thread 372 engage the arms 301 and 302, respectively. The optical fiber 33 is embedded with gratings at the mid-section thereof to form a fiber bragg grating 34. In this way, when manually rotating the threaded rod 37 in one direction, the threaded rod 37 drives the arm 301 gradually closer to the arm 302. When manually rotating the threaded rod 37 in the opposite direction, the threaded rod 37 drives the arm 302 gradually away from the arm 301. Since the optical fiber 33 having the fiber bragg grating 34 is affixed to the arms 301 and 302, the threaded rod 37 can manually control the length of the fiber bragg grating to adjust its central wavelength.

The process for the preparation of the zirconium tungstate ceramic body and the novel zirconium tungstate ceramic body of the present invention are further illustrated by the following examples. Nonetheless, it should be noted that the working examples are provided for persons skilled in the art to practice the present invention accordingly, rather than intended to limit the protection scope of the present invention.

EXAMPLE 1

Figure 4:
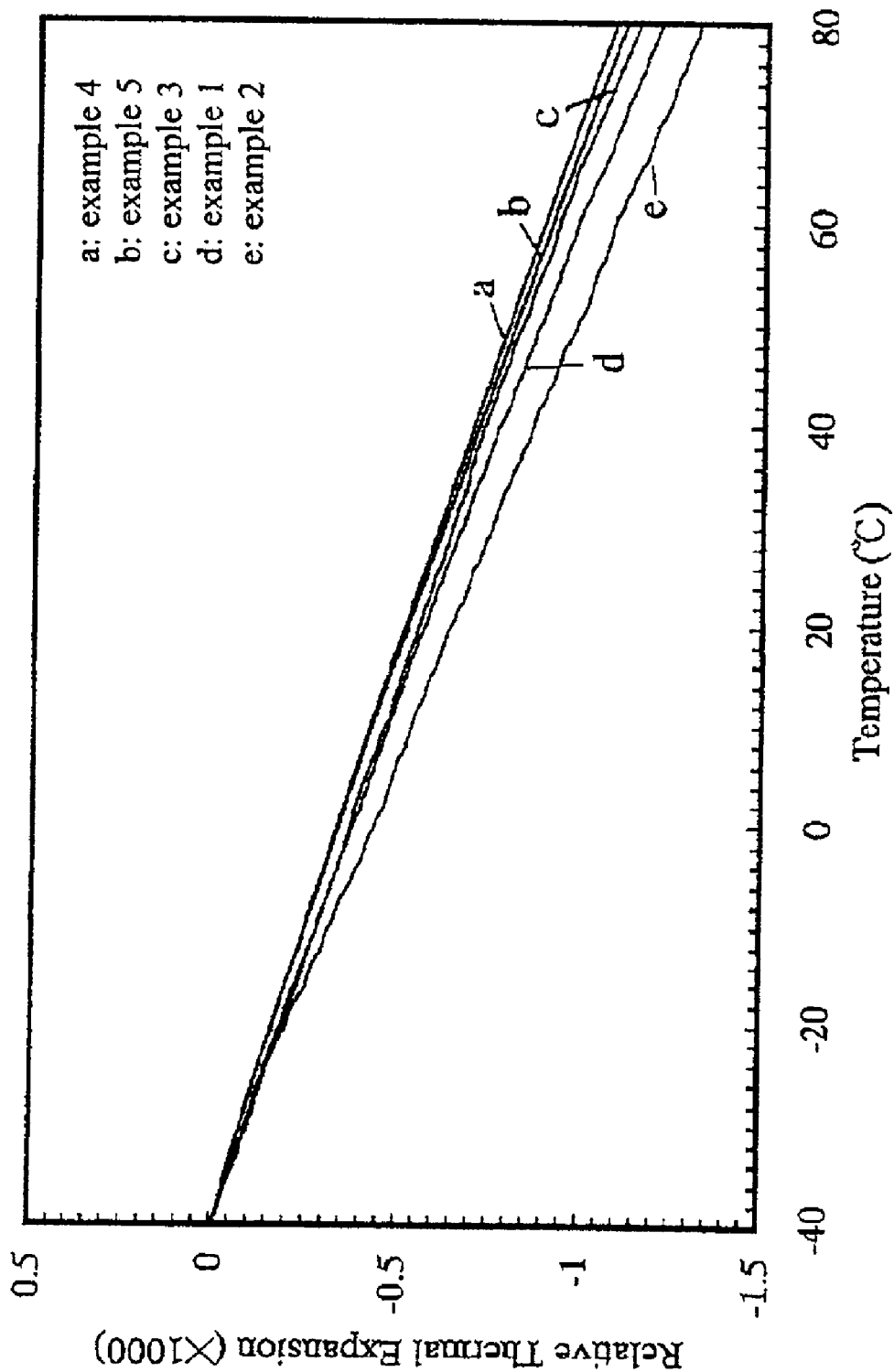
FIG. 4 shows the curves illustrating the relative expansion of the zirconium tungstate ceramic bodies of Examples 1 to 5 over temperature.

The Preparation of Zirconium Tungstate Ceramic Substrate—Without Adding Powders of Zirconium Tungstate Single Crystal The $ZrO_2$ and $WO_3$ powders in the molar ratio of 1:2 (Zr:W) and an organic binder were dispersed in deionized water, grounded and admixed to form a slurry. The mixed well slurry was dried at 105° C. The dried powders of 25 g were dry-pressed to form a plate-shaped compact of 60 mm×35 mm. The plated-shaped compact was sintered at 1200° C. for 6 hours and then was immediately quenched to room temperature in the air to obtain a single-phase $\alpha$-$ZrW_2O_8$ ceramic body. The thermal expansion coefficient of the zirconium tungstate ceramic body, measured by dilatometer over −40° C. to 80° C., was found to be $-10.02 \times 10^{-6}$ $K^{-1}$. The relative expansion of the zirconium tungstate ceramic body over temperature was shown as curve d in FIG. 4. After being abraded on both surfaces to the desired thickness, the zirconium tungstate ceramic substrate was diced by a diamond saw to a desired size and then packaged.

EXAMPLE 2

The Preparation of Zirconium Tungstate Ceramic Substrate—Seeding of Zirconium Tungstate Powders 1.0 wt. % of zirconium tungstate powders were added to the mixture of $ZrO_2$ and $WO_3$ powders in the molar ratio of 1:2 (Zr:W) as the seeds for the formation of zirconium tungstate grain by reactive sintering, the raw materials were then ground and admixed in deionized water. The well mixture was admixed with an organic binder and then dried. The dried powders of raw materials of 25 g were dry-pressed to form a plate-shaped compact of 60 mm×35 mm. The plate-shaped compact was sintered at 1150° C. for 4 hours and then was immediately quenched to room temperature in the air to obtain a single-phase $\alpha$-$ZrW_2O_8$ ceramic body. The sintering temperature and duration were obviously lessened. The thermal expansion coefficient of the zirconium tungstate ceramic body was $-10.85 \times 10^{-6}$ $K^{-1}$. The relative expansion of the zirconium tungstate ceramic body over temperature was shown as curve e in FIG. 4. After being abraded on both surfaces to the desired thickness, the zirconium tungstate ceramic substrate was diced by a diamond saw to a desired size and then packaged.

EXAMPLE 3

Tuning the Thermal Expansion Coefficient of Zirconium Tungstate Ceramic Substrate—Using Non-Stoichiometric $ZrO_2$ and $WO_3$ After 10.4 g of $ZrO_2$ powders and 31.6 g of $WO_3$ powders were ground and admixed in deionized water, an organic binder was added to form slurry and then dried at 105° C. The preparation and processing after drying were those as shown in Example 1. The thermal expansion coefficient of the obtained zirconium tungstate ceramic body was $-9.51 \times 10^{-6}$ $K^{-1}$. The relative expansion of the zirconium tungstate ceramic body over temperature was shown as curve c in FIG. 4.

To further lower the sintering temperature and shorten the sintering duration by adding the zirconium tungstate seeds, the raw materials were replaced with 10.316 g of $ZrO_2$ powders, 31.284 g of $WO_3$ powders, and 0.4 g of $ZrW_2O_8$ powders. The subsequent admixing steps were the same as the above. Because adding the seeds, the obtained plate-shaped compact could form zirconium tungstate ceramic body by the reactive sintering at 1150° C. for 4 hours. The sintering temperature and sintering duration were obviously lessened. The property of the obtained ceramic body was identical to the above one.

EXAMPLE 4

Tuning the Thermal Expansion Coefficient of Zirconium Tungstate Ceramic Substrate—Adding an Inorganic Binder After 8.4 g of $ZrO_2$ powders and 31.6 g of $WO_3$ powders were ground and admixed in deionized water, 2.1 g of $Na_2O \cdot nSiO_2$ (solid content: 38.1 wt. %) was added to form slurry. The slurry was well admixed and then dried at 105° C. The dried powders of 25 g were dry-pressed to form a plate-shaped compact of 60 mm×35 mm. The plated-shaped compact was reactive sintered at 1150° C. for 6 hours and then immediately quenched to room temperature in the air. The thermal expansion coefficient of the obtained zirconium tungstate ceramic body was $-9.02 \times 10^{-6}$ $K^{-1}$. The relative expension of the zirconium tungstate ceramic body over temperature was shown as curve a in FIG. 4. After being abraded on both surfaces to the desired thickness, the zirconium tungstate ceramic substrate was diced by a diamond saw to a desired size and then packaged.

EXAMPLE 5

Tuning the Thermal Expansion Coefficient of the Zirconium Tungstate Ceramic Substrate—Using an Organic Binder Capable of Generating Pores After a Heat Treatment After 8.4 g of $ZrO_2$ powders and 31.6 g of $WO_3$ powders were ground and admixed in deionized water for 24 hours, the mixture was incorporated into starch dispersed in water to form slurry (solid content: 45 vol. %). The slurry was poured into a mold, heated and cured at 80° C. for 1 hour. After removing the mold, the product was dried at 120° C. for 12 hours to form a green body. The obtained green body was heated to 500° C. to debinder and then sintered at 1200° C. for 5 hours to form a porous zirconium tungstate ceramic body with a thermal expansion coefficient of $-9.21 \times 10^{-6}$ $K^{-1}$. The relative expansion of the zirconium tungstate ceramic body over temperature was shown as curve b in FIG. 4. After being abraded on both surfaces to the desired thickness, the zirconium tungstate ceramic substrate was diced by a diamond saw to a desired size and then packaged.

To further lower the sintering temperature and shorten the sintering duration by adding the zirconium tungstate powders as seeds, the raw materials were replaced with 8.316 g of $ZrO_2$ powders, 31.284 g of $WO_3$ powders, and 0.4 g of $ZrW_2O_8$ powders. The subsequent admixing steps were the same as the above. Because adding the seeds, the obtained green body could form porous zirconium tungstate ceramic body by the reactive sintering at 1160° C. for 3.5 hours. The sintering temperature and sintering duration were obviously lessened. The property of the obtained ceramic body was identical to the one above.

What is claimed is:

1. A process for preparing a zirconium tungstate ceramic body, comprising
   (a) dispersing the raw materials powders comprising a Zr-containing compound and a W-containing compound and powders of zirconium tungstate single crystal in deionized water and through grinding and admixing to form a slurry.
   (b) adding a binder to the slurry of (a) to form a mixture;
   (c) drying the mixture of (b) to get granules and then dry-pressing them to form a compact; and
   (d) sintering the compact to obtain the zirconium tungstate ceramic body; wherein the amount of the powders of zirconium tungstate single crystal is from about 0.1 to about 5 wt %, based on the total weight of the raw materials powders.

2. The process of claim 1, wherein the amount of the Zr-containing compound and the W-containing compound in step (a) is stoichiometric.

3. The process of claim 1, wherein the amount of the Zr-containing compound and the W-containing compound in step (a) is non-stoichiometric.

4. The process of claim 1, wherein the Zr-containing compound and W-containing compound are selected from the group consisting of oxides, sulfates, carbonates, nitrates, acetates, sulfides, and hydroxides of Zr and W, tungsten metal, tungstic acid ($H_2WO_4$) and mixtures thereof.

5. The process of claim 1, wherein the Zr-containing compound is $ZrO_2$ and the W-containing compound is $WO_3$.

6. The process of claim 1, wherein the amount of the powders of zirconium tungstate single crystal is from about 0.5 to about 2 wt % based on the total weight of the raw materials powders.

7. The process of claim 1, wherein the binder is an organic binder.

8. The process of claim 1, wherein the binder is $Na_2O \cdot nSiO_2$ forming a second phase uniformly distributed inside the zirconium tungstate ceramic body after being sintered.

9. The process of claim 7, wherein step (c) is carried out by pouring the slurry into a mold and heating at a temperature above the gelation temperature of the binder to cure and obtain a ceramic green body, then heating to remove the binder.

10. The process of claim 1, wherein the sintering temperature in step (d) is from about 1105 to about 1257° C.

11. The process of claim 1, wherein the sintering duration is from about 1 to about 10 hours.

12. A process for preparing a zirconium tungstate ceramic body with a thermal expansion coefficient different from that of a pure phase zirconium tungstate ceramic body, comprising
   (a) admixing powders of zirconium tungstate, single crystal a binder, and optionally powders of $ZrO_2$ and $WO_3$ to form a slurry;
   (b) drying and then dry-pressing the slurry to form a compact; and
   (c) sintering the compact to obtain the zirconium tungstate ceramic body; wherein when the binder comprises an inorganic binder, the zirconium tungstate ceramic body contains a second phase comprising at least the residues of the inorganic binder, and when the binder comprises no inorganic binder, the zirconium tungstate ceramic body contains a second phase comprising at least either $ZrO_2$ or $WO_3$, or pores.

13. The process of claim 12, wherein the binder is $Na_2O \cdot nSiO_2$.

14. The process of claim 12, wherein step (b) is carried out by pouring the slurry into a mold and heating at a temperature above the gelation temperature of the binder to cure and obtain a ceramic green body, then sintering the ceramic green body.

15. The process of claim 12, wherein the sintering temperature in step (c) is from about 1105 to about 1257° C.

16. The process of claim 12, wherein the sintering duration is from about 1to about 10 hours.

17. The process of claim 10, wherein the sintering temperature in step (d) is from about 1150 to about 1200° C.

18. The process of claim 11, wherein the sintering duration is from about 3 to about 8 hours.

19. The process of claim 18, wherein the sintering duration is from about 4 to about 6 hours.

20. The process of claim 12, wherein the sintering temperature in step (c) is from about 1150 to about 1200° C.

21. The process of claim 16, wherein the sintering duration is from about 3 to about 8 hours.

22. The process of claim 21, wherein the sintering duration is from about 4 to about 6 hours.

23. The process of claim 1, wherein the raw materials powders are such that the zirconium tungstate ceramic body formed by steps (a)–(d) consists essentially of $ZrW_2O_8$.

24. The process of claim 1, wherein the raw materials powders dispersed in step (a) consist essentially of the Zr-containing compound, the W-containing compound and the powders of zirconium tungstate single crystal, the Zr-containing compound and W-containing compound being selected from the group consisting of oxides, sulfates, carbonates, nitrates acetates, sulfides and hydroxides of Zr and W, tungsten metal, tungstic acid, and mixtures thereof.

25. The process of claim 12, wherein the powders admixed in step (a) are such that the zirconium tungstate ceramic body formed by steps (a)–(c) consists essentially of a first phase of $ZrW_2O_8$ and a second phase selected from the group consisting of $ZrO_2$, $WO_3$, $Na_2O+ZrSiO_4$, pores and combinations thereof.

26. The process of claim 12, wherein the powders admixed in step (a) are such that the zirconium tungstate ceramic body formed by steps (a)–(c) consists of a first phase of $ZrW_2O_8$ and a second phase selected from the group consisting of $ZrO_2$, $WO_3$, $Na_2O+ZrSiO_4$, pores and combinations thereof.

* * * * *